Jan. 27, 1948.  G. R. PHILLIPS  2,435,097
EDUCATIONAL DEVICE
Filed May 9, 1946
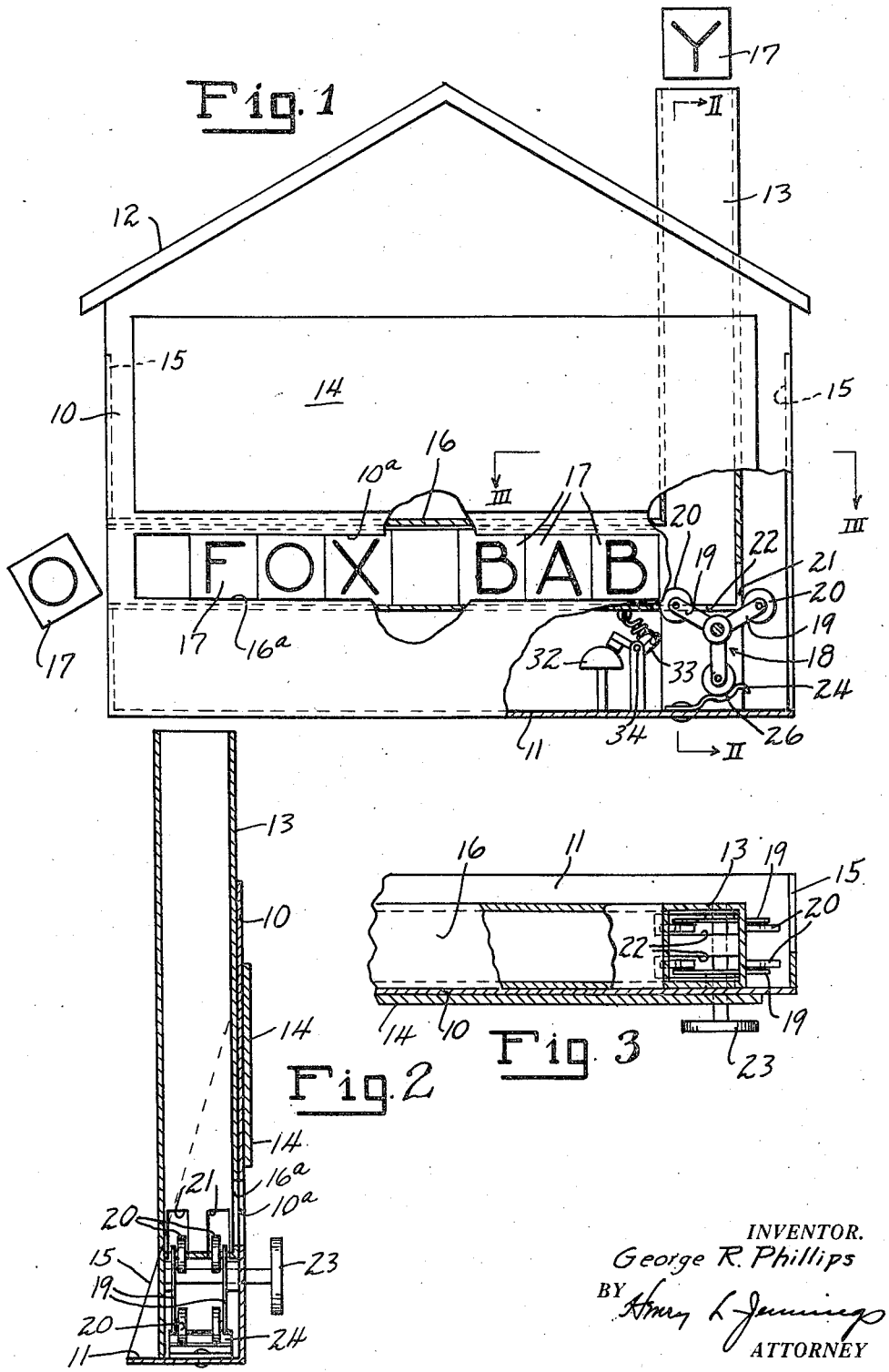
INVENTOR.
George R. Phillips
BY
ATTORNEY Patented Jan. 27, 1948

2,435,097

UNITED STATES PATENT OFFICE 2,435,097

EDUCATIONAL DEVICE

George R. Phillips, Birmingham, Ala.

Application May 9, 1946, Serial No. 668,523

5 Claims. (Cl. 35—73)

This invention relates to an educational device, particularly to one for teaching small children the association of letters and characters in spelling, sentence forming, and arithmetic.

One of the objects of my invention is to provide a device of the character designated which shall be attractive and interest-creating and one which shall include a plurality of blocks bearing various printed characters, and mechanical means for bringing said characters into view in selected sequence.

Briefly, my invention comprises a panel made to simulate one side of a house with a chimney at one end thereof, the chimney forming a vertical chute with the front lying in the plane of the panel and the rear extending rearwardly therefrom. The lower end of the vertical chute is joined by a horizontal chute of similar dimensions with its front open to view and its rear extending rearwardly from the panel. Both the vertical and the horizontal chutes are adapted to receive rectangular blocks having various characters or numbers printed thereon and which are adapted to be dropped down the vertical chute and moved along the horizontal chute in view of a person in front of the device. Where letters of the alphabet are printed on the blocks, they may be dropped down the vertical chute and moved along the horizontal chute in position to form words and sentences. The blocks are moved along the horizontal chute by means of a rotary member having arms projecting through slots in the chute in a position to engage the blocks one at a time and move them along, one pushing the other. A warning bell has a clapper actuating member in the path of the rotating arm and is so disposed that each time a block is moved into the horizontal chute in position to be viewed from the front, the warning signal is actuated, thereby attracting attention of the pupils being taught. The end of the horizontal chute remote from the vertical chute is open so that, for example, as new words are formed, the blocks already used in forming other words are expelled from the horizontal chute and may be used again.

A device embodying features of my invention is illustrated in the accompanying drawing, forming a part of this application, in which Fig. 1 is a front elevational view;

Fig. 2 is a sectional view taken along the line II—II of Fig. 1; and

Fig. 3 is a sectional view taken along the line III—III of Fig. 1.

Referring now to the drawing for a better understanding of my invention, I show a panel 10 which may be supported in a vertical position by means of a rearwardly extending flange 11 and triangular brace 15 secured to the rear. The panel 10 is preferably made to represent one side or end of a house with a roof line 12 and with a chimney 13 at one end thereof. In the place of windows, the central portion of the panel is preferably framed to form a blackboard 14 upon which the pupils may write.

The chimney 13 forms a vertical chute extending along the right hand end of the panel and extends downwardly to a point near the lower edge thereof where it is joined by a horizontally extending chute 16 having an opening 16a along the front thereof, aligned with a similar opening 10a in the panel 10. As will be seen in Fig. 2, the chutes 13 and 16 project rearwardly from the panel 10. The chutes 13 and 16 are of similar dimensions and are adapted to receive rectangular blocks 17 which are dropped one at a time down the chute 13 and are propelled along the chute 16, to be viewed through the openings 16a and 10a. The rectangular blocks 17 may be printed with various characters, such as the letters of the alphabet, numbers and pictures and some may be left blank to teach the spacing between words. Various characters will suggest themselves to those skilled in the teaching profession as suitable for printing on the blocks.

The blocks 17 are propelled along the horizontal chute 16 by means of a rotary member 18 mounted in the lower end of an extension of the chute 13 and having radial arms 19 with rollers 20 thereon disposed to engage the blocks one at a time and move them along the chute. The lower end of the chute 13 is provided with slots 21 and the end of the chute 16, adjacent the lower end of the chute 13 is provided with slots 22 to permit the arms 19 to pass therethrough and engage the blocks. The rotary member may be actuated manually by means of a knob 23 on the forward end thereof. Mounted on the rearwardly extending flange in the path of the rollers 20 is a spring 24 having a recess 26 therein to engage a roller 20 each time it passes and thus provides a yielding holding recess for the rotary member 18.

Also mounted on the rear of the panel 10 is a bell 32 having a spring pressed clapper arm 33 pivotally mounted at 34 in the path of the rollers 20, whereby each time a block is moved into the horizontal passage 16 by one of the arms 19, the clapper is actuated and the bell is sounded. This feature is important in attracting the attention of the pupils and in maintaining their interest. The outer end of the chute 16, remote from the vertical chute 13, is open so that blocks 17 are discharged from the open end thereof as fresh ones are propelled into the opposite end and push the blocks already in the chute toward the left as viewed in the drawing.

In use, it will be seen that a teacher may fill the vertical chute 13 with enough blocks to spell a word or words, or form a sentence, or present a problem, and then turn the rotary member 18 to bring the blocks into view in the chute 16, one at a time. Various combinations of the blocks may be employed for that purpose as will be readily understood.

From the foregoing it will be apparent that I have devised an improved educational device which is simple of construction and operation, and one which is attractive and interest-creating in children, and which includes means for bringing various printed characters into association in the forming of words, sentences, and simple arithmetic problems.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in appended claims.

What I claim is:

1. In an educational device of the character described, a plurality of blocks some of which bear printed characters, a vertical chute adapted to receive the blocks one at a time and in which the blocks fit, a horizontal chute having an open slot along its front side and joined at one end to the lower end of the vertical chute, and a manually operable rotary member having radially projecting arms thereon disposed at the lower end of the vertical chute and adapted to engage the blocks one at a time and propel them horizontally along the horizontal chute.

2. An educational device in the form of a panel made to simulate a side of a house with a chimney at one end forming a vertical chute, said panel having a horizontal opening therethrough at the lower end of the vertical chute, a horizontal chute open along the front joined to the lower end of the vertical chute, said horizontal chute projecting rearwardly from the panel behind the horizontal opening, a plurality of blocks fitting the chutes and adapted to be dropped one at a time down the vertical chute, a rotary member having radially projecting arms thereon disposed adjacent the lower end of the vertical chute and disposed to engage the blocks and propel them along the horizontal chute in view of a person in front of the device, said chutes being slotted to permit the passage of the radial arms.

3. A device as set forth in claim 2 in which some of the blocks bear printed characters and in which the end of the horizontal chute remote from the vertical chute is open to discharge the blocks after they have passed through the horizontal chute.

4. A device as set forth in claim 2 in which signal means are provided, and means for actuating the same each time the rotary member moves a block into the horizontal chute.

5. A device as set forth in claim 2 in which the arms of the rotary member are provided with rollers on the outer ends thereof to engage the blocks, and a spring having a concavity therein mounted in the path of the rollers, said spring being so disposed that each time a roller passes it is engaged in the recess to provide a yielding holding means for the rotary member.

GEORGE R. PHILLIPS.

REFERENCES CITED

The following references are of record in the file of this patent:

UNITED STATES PATENTS

| Number | Name | Date |
| --- | --- | --- |
| 1,354,692 | Runyan | Oct. 5, 1920 |
| 1,370,826 | Mathis | Mar. 8, 1921 |
| 1,378,874 | Klingbeil | May 24, 1921 |
| 1,385,356 | Bates | July 26, 1921 |
| 1,502,991 | Klingbeil | July 29, 1924 |
| 1,562,518 | Runyan | Nov. 24, 1925 |
| 2,218,375 | Axelrod | Oct. 15, 1940 |